Patented May 15, 1934

1,959,185

UNITED STATES PATENT OFFICE 1,959,185

PRODUCTION OF ADHESIVES

Hanns Wappes and Hugo Klingenberg, Ludwigshafen-on-the-Rhine, Germany, assignors to I. G. Farbenindustrie Aktiengesellschaft, Frankfort-on-the-Main, Germany No Drawing. Application June 17, 1930, Serial No. 461,846. In Germany July 24, 1929

13 Claims. (Cl. 87—17)

The present invention relates to the production of adhesives.

Alkaline solutions of casein have been employed for adhesive purposes for a long time. The preparations and processes for their production hitherto in use are however impaired by several drawbacks. Thus, for example, the mixtures of casein and alkali are difficultly homogenized with water so that knots and lumps are formed which can be homogenized only with great difficulties, the same drawback occurring also in cases where dry casein is dissolved in alkaline solutions. In any case the adhesive power of the preparations is reduced due to the insufficient homogenization which is difficult to avoid even when the casein has been swollen before its dissolution. Moreover, casein cements prepared in the aforesaid manner sometimes show a tendency to become brittle after setting; in order to avoid this drawback water-soluble colloids such as gelatine or glue have been added to the casein preparations, if desired together with agents reducing the surface tension of the solutions and depolymerizing the glue or gelatine to some degree. Casein cements containing glue, gelatine or similar water-soluble colloids are however not fast to water so that the brittleness of the set cements is reduced but their sensitivity to water is increased. On the other hand salts of sulphonic acids of organic compounds of low molecular weight such as the salts of naphthalene sulphonic acid have been added to casein and other animal colloids in order to reduce the viscosity of the solutions in water of the casein and the like; however, by the said additions the dissolution of the casein is not accelerated and not facilitated.

We have now found that highly valuable adhesives which are free from the aforesaid drawbacks can be prepared by incorporating casein, or mixtures thereof with alkali or an alkaline earth metal oxide or both, with a sulphonated organic compound containing at least 12, preferably at least 13 carbon atoms in its molecule of which carbon atoms at least three must be present in the form of an aliphatic chain. Sulphonation products according to this definition are for example the sulphonic acids of aromatic compounds of high molecular weight, such as homologues of naphthalene which contain an aliphatic open chain of at least three carbon atoms, as for example in propyl, butyl or amyl naphthalene, dibutyl naphthalene and the like and sulphonic acids obtainable from tar oils or mineral oil fractions containing hydrocarbons and other compounds of the molecular size mentioned above; aliphatic sulphonation products corresponding to the aforesaid definition may also be employed and these may be sulphonic acids as well as sulphuric esters of the aliphatic compounds. Aliphatic sulphonation products of the said nature are for example the sulphuric esters of the fatty acids of high molecular weight occurring in vegetable or animal fats such as oleic, ricinoleic, stearic or palmitic acids and in the substitutes of such acids, obtainable for example in the destructive oxidation of paraffin and like waxes, paraffin oil, petroleum jelly and the like with the aid of oxygen, mixtures containing oxygen, such as air, or with nitrogen oxides or mixtures of nitrogen oxides and oxygen. Suitable sulphonic acids of aliphatic compounds are for example the sulphonic acids of the aforesaid fatty acids and of their substitutes and of aliphatic and cycloaliphatic hydrocarbons of high molecular weight such as paraffin waxes, petroleum jelly and fractions of mineral oils of high boiling point. Other suitable sulphonation products are those obtained from olefines and derivatives thereof having a number of carbon atoms as hereinbefore defined, and those of high molecular alcohols such as lauryl alcohol, cetyl alcohol or octodecyl alcohol. The sulphonic acids are usually obtained by a sulphonation under stronger conditions than is required for the production of the sulphuric esters as regards the quantity of sulphonating agent employed, the temperature of working and the employment of catalysts such as anhydrides of organic or inorganic strong acids, and the employment of a diluent which is not attacked during the sulphonation such as carbon tetrachloride, acetic acid and the like.

The quantity employed of the said sulphonation products is generally from 0.1 to 5 per cent by weight of the casein solution employed, but in most cases quantities of from 0.5 to 2 per cent are thoroughly sufficient for obtaining very good results. The casein may be incorporated with the said sulphonation products in the dry state together with the quantity of caustic alkali usually employed for the dissolution of the casein, or of a mixture of caustic alkali and of an alkaline earth metal oxide or hydroxide, so that dry preparations can be obtained by grinding or otherwise homogenizing the mixtures which are then ready for use after dissolution in water. These dry preparations are very stable to any influences and may be stored for a long time. If, however, the production of an adhesive directly ready for use is desired, the casein may be incorporated with water and with the sulphonation product and after the casein has been soaked the alkali or mixtures thereof with alkaline earth metal oxide or hydroxide may be added, but any other order of mixing the said ingredients may be followed if so desired. Since the sulphonation products show an acid reaction they combine instantly with some part of the alkali required for the dissolution of the casein and in most cases it will be more advantageous to employ the said sulphonation products in the form of their water-soluble salts so that no consumption of alkali occurs. The employment of these salts is particularly advantageous in the preparation of dry mixtures described above, since several of the sulphonation products are of oily character so that they can be difficultly homogenized with the other dry constituents of the mixtures. The said water-soluble salts may be chosen from alkali metal salts or from salts of the sulphonic acids with organic bases such as the higher aliphatic amines, alkylol amines as for example mono-, di- or tri-ethanolamine, from cycloaliphatic amines such as cyclohexylamine, cyclohexyl ethanol amine and the like. The term "salts" is used in a broad sense to include the water-soluble amides and esters of the acids since the carboxyl groups in these derivatives are neutralized therein similarly as in the salts, and since esters and amides can be considered as organic salts. Thus, use may be made of sulphonated palmitic acid ethanol-amide, or of the sulphonated anilides of the fatty acids of coconut oil, or of oleic acid methyl tauride obtainable by converting oleic acid chloride with methyl taurine in alcoholic solution. If desired the sulphonation products may be partly replaced by aryl or alkyl phosphates.

The alkali necessary for the dissolution of the casein may be chosen in the usual manner from the alkali metal oxides or hydroxides or their alkaline salts such as sodium carbonate, borax, disodium phosphate, trisodium phosphate or waterglass, or ammonia, or from mixtures thereof with alkaline earth metal oxides or hydroxides which latter are included for the sake of brevity within the term "alkaline substance" in the following and in the claims.

The liquid preparations as well as the dry preparations after their dissolution in water constitute highly valuable adhesives of suitable viscosity which do not separate or decompose on standing but retain their viscosity and adhesive power much longer than preparations of casein prepared in another manner.

The following examples will further illustrate the nature of this invention but the invention is not restricted thereto. The parts are by weight.

Example 1

21 parts of the ground crude casein are soaked for a few minutes in a solution of from 1 to 2 parts of di-isopropyl, or di-butyl, naphthalene sulphonic sodium salt; a mixture of 3 parts of calcium hydroxide, 6 parts of aqueous caustic soda of 40° Bé. strength and 35 parts of water are then added, an adhesive ready for use being obtained after short stirring and homogenizing.

The aforesaid sulphonic acid salts may be replaced by sulphonation products of mineral or tar oil fractions the constituents of which have a high molecular weight, such as fractions boiling above 180° to 200° C., by sulphuric esters or sulphonic acids of palmitic, stearic, myristic, oleic, ricinoleic and like acids of the fatty acid series or of esters, amides, hydroxyalkyl amides of the said sulphonation products or, preferably, by the alkali metal salts of the aforesaid compounds.

Example 2

42 parts of ground crude casein are intimately mixed with from 2 to 4 parts of di-isopropyl, or di-butyl, naphthalene sulphonic sodium salt, 6 parts of calcium hydroxide and 4.2 parts of ground solid caustic soda. The mixture may be stored and furnishes on stirring it with water an adhesive of any desired consistency which is entirely free from knots or lumps and which possesses a very high adhesive power.

What we claim is:—

1. A composition, suitable for making an adhesive by adding water, consisting of casein, a quantity of an alkaline substance sufficient for dissolving said casein in water and from about 0.47 to about 23.5 per cent by weight of the casein of a water-soluble salt of a sulphonation product of an organic compound containing at least 12 carbon atoms in its molecule, at least three of the said carbon atoms being present in the form of an aliphatic open chain.

2. A composition, suitable for making an adhesive by adding water, consisting of casein, a quantity of an alkaline substance sufficient for dissolving said casein in water and from about 0.47 to about 23.5 per cent by weight of the casein of a water-soluble salt of a sulphonation product of an organic compound containing at least 13 carbon atoms in its molecule, at least three of the said carbon atoms being present in the form of an aliphatic open chain.

3. A composition, suitable for making an adhesive by adding water, consisting of casein, a quantity of an alkaline substance sufficient for dissolving said casein in water and from about 0.47 to about 23.5 per cent by weight of the casein of a water-soluble salt of a sulphonic acid of an aromatic compound containing at least 13 carbon atoms in its molecule, at least three of the said carbon atoms being present in the form of an aliphatic open chain.

4. A composition, suitable for making an adhesive by adding water, consisting of casein, a quantity of an alkaline substance sufficient for dissolving said casein in water and from about 0.47 to about 23.5 per cent by weight of the casein of a water-soluble salt of a sulphonic acid of a naphthalene containing at least one aliphatic side chain with at least 3 carbon atoms.

5. A composition, suitable for making an adhesive by adding water, consisting of casein, a quantity of an alkaline substance sufficient for dissolving said casein in water and from about 0.47 to about 23.5 per cent by weight of the casein of a water-soluble salt of a sulphonic acid of a naphthalene containing at least one aliphatic side chain with from 3 to 4 carbon atoms.

6. A composition, suitable for making an adhesive by adding water, consisting of casein, a quantity of an alkaline substance sufficient for dissolving said casein in water and from about 0.47 to about 23.5 per cent by weight of the casein of a water-soluble salt of butylated naphthalene sulphonic acid.

7. A composition, suitable for making an adhesive by adding water, consisting of casein, a quantity of an alkaline substance sufficient for dissolving said casein in water and from about 5 to about 9 per cent by weight of the casein of the sodium salt of a butylated naphthalene sulphonic acid.

8. A process of accelerating the dissolution of casein in alkaline solvents, which comprises adding to the casein from 0.1 to 5 per cent by weight of the casein solution of a water-soluble salt of a sulphonation product of an organic compound containing at least 12 carbon atoms in its molecule, at least 3 of the said carbon atoms being present in the form of an aliphatic open chain.

9. A process for accelerating the dissolution of casein in alkaline solvents, which comprises adding to the casein from 0.1 to 5 per cent by weight of the casein solution of a water-soluble salt of a sulphonation product of an organic compound containing at least 13 carbon atoms in its molecule, at least 3 of the said carbon atoms being present in the form of an aliphatic open chain.

10. A process of accelerating the dissolution of casein in alkaline solvents, which comprises adding to the casein from 0.1 to 5 per cent by weight of the casein solution of a water-soluble salt of a sulphonic acid of an aromatic compound containing at least 13 carbon atoms in its molecule, at least three of the carbon atoms being present in the form of an aliphatic open chain.

11. A process of accelerating the dissolution of casein in alkaline solvents, which comprises adding to the casein from 0.1 to 5 per cent by weight of the casein solution of a water-soluble salt of a sulphonic acid of a naphthalene containing at least one aliphatic side chain with at least 3 carbon atoms.

12. A process of accelerating the dissolution of casein in alkaline solvents, which comprises adding to the casein from 0.1 to 5 per cent by weight of the casein solution of a water-soluble salt of a sulphonic acid of a naphthalene containing at least one aliphatic side chain with from 3 to 4 carbon atoms.

13. A process of accelerating the dissolution of casein in alkaline solvents, which comprises adding to the casein from 0.1 to 5 per cent by weight of the casein solution of a water-soluble salt of a butylated naphthalene sulphonic acid.

HANNS WAPPES.
HUGO KLINGENBERG.